United States Patent [19]

Fauth, Sr.

[11] Patent Number: 4,828,103

[45] Date of Patent: May 9, 1989

[54] CONVEYOR DRIVE UNIT AND METHOD FOR OPERATION THEREOF

[75] Inventor: Frederick E. Fauth, Sr., Towson, Md.

[73] Assignee: American Bottlers Equipment Co., Inc., Owings Mills, Md.

[21] Appl. No.: 35,374

[22] Filed: Apr. 8, 1987

[51] Int. Cl.⁴ .................................. B65G 13/06
[52] U.S. Cl. .................... 198/781; 198/789; 198/791
[58] Field of Search .......... 198/781, 783, 788, 789, 198/790, 791

[56] References Cited

U.S. PATENT DOCUMENTS

| 4,063,636 | 12/1977 | vom Stein | 198/799 X |
| 4,240,538 | 12/1980 | Hawkes et al. | |
| 4,313,536 | 2/1982 | Fauth | 198/781 |
| 4,343,396 | 8/1982 | George | 198/781 |
| 4,453,627 | 6/1984 | Wilkins | 198/781 |
| 4,488,638 | 12/1984 | Morgan et al. | 198/781 |
| 4,570,780 | 2/1986 | Thwaites et al. | 198/781 |

FOREIGN PATENT DOCUMENTS

| 2806640 | 8/1978 | Fed. Rep. of Germany | 198/781 |
| 3222028 | 1/1983 | Fed. Rep. of Germany | 198/781 |
| 1150974 | 10/1967 | United Kingdom . | |

Primary Examiner—Robert J. Spar
Assistant Examiner—Lyle Kimms
Attorney, Agent, or Firm—Wegner & Bretschneider

[57] ABSTRACT

An improved conveyor drive unit with a method of operation thereof, which can be rapidly and easily mounted on a roller-type conveyor system and which, when arranged in series, can be sequentially stopped and restarted relative to predetermined parameters in the article flow along a conveyor path. In one embodiment, each drive unit has an arm which extends at a desired distance over an article conveyor path which can be tripped at the occurrence of accumulation. A pneumatic valve is operably coupled to the arm for releasing air into an actuating cylinder having operably coupled thereto a shifter rod. The shifter rod is axially displaced by the actuating cylinder which in turn releases a drive collar from a keyed sprocket of the pinion gears of a transfer mechanism or "module" of the conveyor system. When the drive collar is disengaged, the operation of transport mechanism or module is thus halted. When normal article flow is to be resumed, the drive collar is engaged to the sprocket and the transport mechanism or module is restarted. Instead of an arm operable coupled to the pneumatic valve, article sensing, counting and timing device operably coupled to solenoids are used in other embodiments.

20 Claims, 8 Drawing Sheets

CONVEYOR DRIVE UNIT AND METHOD FOR OPERATION THEREOF

BACKGROUND OF THE INVENTION

This invention relates to transfer mechanisms and, more particularly, this invention relates to a transfer mechanism for transporting containers and an improved conveyor drive unit therefor.

Generally, the instant invention relates to the automatic and sequential starting and stopping of a plurality of drive units relative to a predetermined parameter of the flow of articles along the transfer mechanism.

The transfer or conveyance of articles from one location to another during processing is universally used in industry. Various types of conveyor systems have been used including the use of chains having individual links hingedly connected together. When it is desired to transfer moving articles from one conveyor to another, the conveyors are often disposed at least partially alongside each other. A problem often occurs in this type of conveyor system which inherently uses a "dead plate" between conveyor stations in that the articles tend to remain on the dead plate if no articles immediately follow the moving articles to push them along. Also, there is nothing to prevent unstable articles from falling over when pushed onto or off of the dead plate. Moreover, the friction inherent between the chain and certain types of the moving articles which it supports could tend to cause backing up of the articles. This problem has been recognized and a solution has been provided with the use of rollers as means for supporting and conveying the articles.

With the use of rollers, there is much less contact area between the conveyor surface and the articles, thereby improving the control of the articles being transported. Moreover, as will be discussed below with reference to U.S. Pat. No. 4,313,536, separate drive systems can be implemented at various portions of a roller type conveyor system which further increases flexibility in the movement of the articles.

Various types of direct drives using a brake system have been devised, as in U.S. Pat. No. 3,621,982 issued to Fred J. Fleischauer on Nov. 23, 1971. In U.S. Pat. No. 3,621,982, a flexible band is disposed against certain powered conveyor rollers so that when tension is placed on the band, selected rollers are prevented from operating. Similarly, U.S. Pat. Nos. 3,650,375, 3,696,912 and 3,961,700, issued on Mar. 21, 1972, Oct. 10, 1972 and June 8, 1976, respectively, to Fred J. Fleischauer et al., teach roller brakes wherein each roller is connected to a pulley by a resilient drive belt. However, the braking devices in the above-described Fleischauer patents are inefficient in that the drive belt can wear out and the tension derived therefrom decreases after a prolonged operation.

Another conveyor driving device has been described in U.S. Pat. No. 3,631,964 issued to Ronald C. Hinman on Jan. 4, 1972. In the Hinman apparatus, a propulsion roller is provided adjacent to an operating roller as a supplement. The propulsion roller in Hinman has on its end portion a clutch actuator which can drive the roller in a desired direction, but requires manual operation thereof (see, also, U.S. Pat. No. 3,610,406 issued to Fred J. Fleischauer on Oct. 5, 1971). In U.S. Pat. No. 3,327,837 issued to G.P. Covell on June 27, 1967, a fluid-operated clutch is used with an idle or gravity roll of a roll-type conveyor. In U.S. Pat. No. 3,667,589 issued to Charles F. Constable on June 6, 1972, a deactivating drive apparatus is disclosed with a longitudinal shaft which can be individually connected to a drive roll. The Covell and Constable patents however lack the flexibility of activating a desired set of drive rollers.

In addition to the above-mentioned deficiencies of the above-described devices, there was no solution to the problem of the continued running of one or more elements of the transfer system thereby possibly resulting in damage to the articles. During the accumulation of articles being transported, the pathways of the transfer system may be blocked off and the operation of the system must be either stopped or curtailed. Although U.S. Pat. No. 3,782,515, issued to W.E. Cowen, Jr. on Jan. 1, 1974, attempts to resolve the problem by providing for automatic halting of a conveyor during accumulation, the Cowen apparatus however uses a drag-responsive torsion spring which responds to a clutch when a pin is depressed under a shaft load in excess of a critical value. The activating mechanism in Cowen is not however directly controlled by the articles being transported thereby increasing the chance of halting a specific roller when not desired. Moreover, Cowen uses a spring activating device which is cumbersome to maintain or repair. Further, due to an indirect control by the articles, relieving of pressure due to article accumulation is inefficient.

U.S. Pat. No. 4,313,536 issued on Feb. 2, 1982 to Frederick E. Fauth, Sr. provides significant improvements over the use of chains. Moreover, U.S. Pat. No. 4,313,536 provides a significant feature of providing separate drive systems in order to obtain flexibility in the movement of articles. The present invention is a device for significantly improving a conveyor system like U.S. Pat. No. 4,313,536 which is embodied herein in its entirety by reference. It is in this separate drive unit, as in U.S. Pat. No. 4,313,536, which when added to a roller-type conveyor system contributes to the significant advantage of being able to automatically control various portions of the conveyor system. But, the system of U.S. Pat. No. 4,313,536 does not provide for "zero pressure" accumulation. By "zero pressure" accumulation is meant accumulation of articles without any significant pressure being applied thereto by the mass of articles being accumulated.

Accordingly, there is a need for an efficient, economical, simply constructed and easily installed means and method of operation thereof for providing a true "zero pressure" (i.e., a smooth transport of articles) during operation of an article transfer system by automatically, directly, individually and sequentially controlling the system by the articles themselves. The drive unit used in the present invention satisfies such a need. The drive unit of the instant invention embodies a simply constucted combination of inexpensive, easily accessible and rapidly manufactured parts, yet efficient when used in an article transfer system in providing a true "zero pressure" (i.e., absence of pressure applied by the articles to abutting articles during accumulation).

SUMMARY OF THE INVENTION

It is a primary object of the present invention to provide a conveyor system, a drive unit therefor, and a method of operating the same which one free of the aforementioned and other such disadvantages.

It is an object of the present invention to provide an improved drive unit and a method of operation thereof which avoids the inadequacies inherent in the prior art.

It is another object of the present invention to provide an improved drive unit and a method of operation thereof which provides a true "zero pressure" for an article transfer.

It is another object of the present invention to provide an improved drive unit which can be rapidly and easily installed in an article transfer.

It is still another object of the present invention to provide a series of improved drive units which can be automatically, directly, individually and sequentially controlled by the articles themselves.

It is still another object of the present invention to provide a series of improved drive units which can be sequentially stopped then re-started when normal article flow along the article transfer system is to be resumed.

It is yet another object of the present invention to provide an improved drive unit which enables an article transfer system to handle labelled, boxed, unstable or lightweight packages at significantly reduced transport pressure.

It is a further object of the present invention to provide an improved drive unit which can selectively terminate operation of a desired portion of an article transfer system to avoid or decrease incidence of roller wear.

It is a further object of the present invention to provide an improved drive unit which reduces the requirement for multiple speed drives and controls for an article transfer system.

The improved conveyor drive unit is used in a transport system having a plurality of transport mechanisms or modules. Each module has a plurality of rollers arranged in a planar array, the drive units and means for connecting the drive units with the rollers. Each drive unit drives a plurality of rollers. Also provided is a means for starting and stopping each drive unit, as well as automatic means for sequentially activating and deactivating the last-mentioned means. The automatic means is responsive to a predetermined parameter in the flow of the articles along the transport system.

In accordance with one embodiment of this invention, an improved conveyor drive unit for rapid and easy mounting on a roller-type conveyor system is disclosed. In this embodiment, an arm extends at a desired distance over an article path. A pivoted end of the arm is operably attached to a pneumatic or air valve. When article accumulation occurs, at least one article displaces the free end of the arm which then trips the pneumatic valve to release air into an actuator cylinder having operably coupled thereto a shifter rod. The shifter rod is axially displaced by the actuating cylinder which in turn releases a drive collar from a keyed sprocket of the pinion gears of a transport mechanism or "module" of the conveyor system. When the drive collar is disengaged, the operation of transfer mechanism or module is halted.

In another embodiment of this invention, a set of sensors, are positioned along the accumulation area of the conveyor path which can activate a series of solenoid valves which in turn sequentially operate and control the drive units. In yet another embodiment of this invention, a set of counting or timing devices are positioned along the in-feed portion of the conveyor path, instead of the just-mentioned set of sensors, for sequentially operating and controlling the drive units relative to the number or speed of the articles being transported along the conveyor path. In both instances, it is preferred that a programmable controller be operably coupled to the solenoid valves and the actuator cylinders for enhancing the sequential operation of the drive units.

Consistent with the foregoing objects, it is an additional object of the present invention to provide a conveyor system embodying the aforementioned drive unit.

It is a further object of the present invention to provide a method of operating a conveyor system in order to achieve zero pressure.

BRIEF DESCRIPTION OF THE DRAWINGS

The foregoing and other objects, features and advantages of this invention will be apparent from the following, more particular, description of the preferred embodiments of this invention, as illustrated in the accompanying drawings wherein:

FIG. 6a is a front elevational view of a drive collar for locking the keyed sprocket of the improved drive unit in accordance with the present invention;

FIG. 6b is a cross-sectional view of the drive collar taken in the direction of arrows 6b—6b shown in FIG. 6a;

FIG. 6c is a cross-sectional view of the drive collar taken in the direction of arrows 6c—6c shown in FIG. 6a;

DESCRIPTION OF THE PREFERRED EMBODIMENTS

Figure 1:
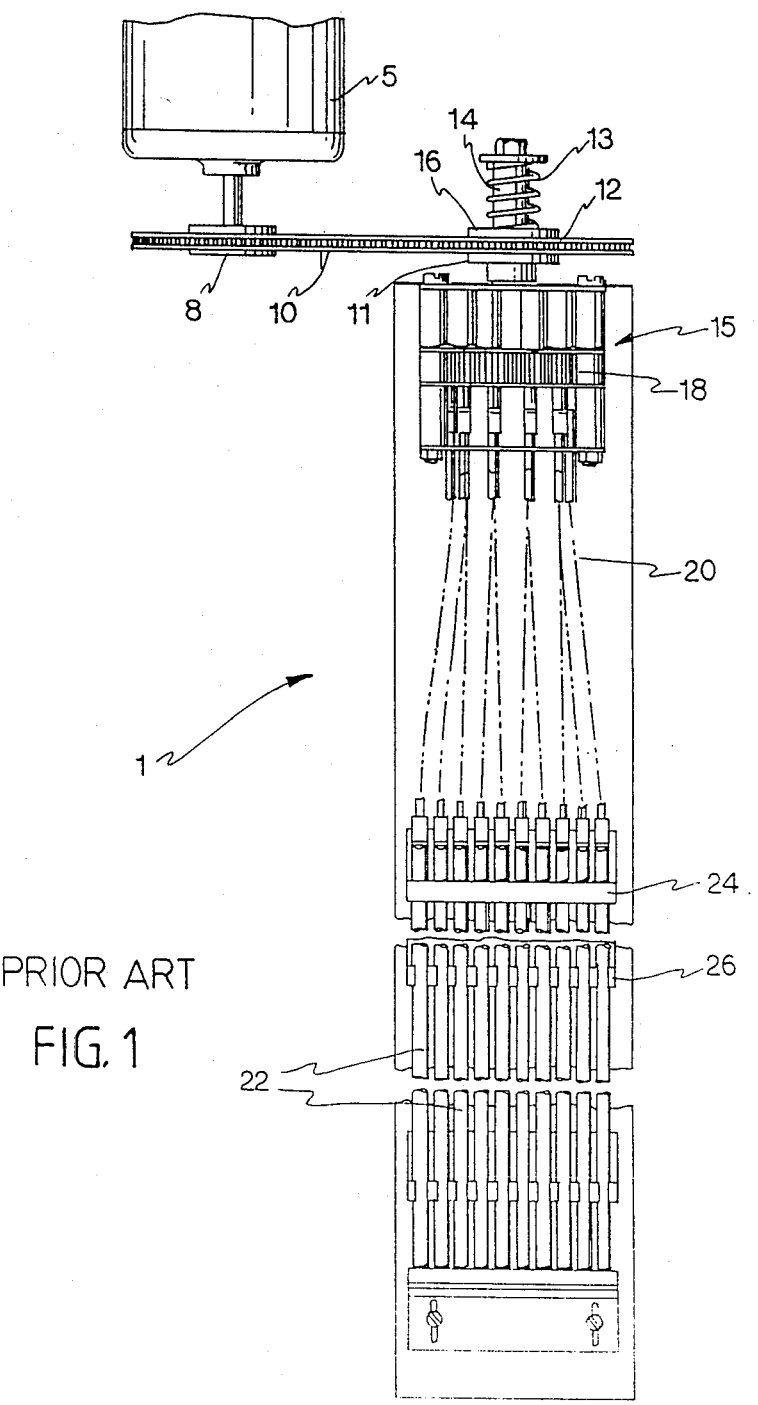
FIG. 1 is a top plan view of a transfer mechanism or "module" operably coupled to associated rollers according to the prior art.

Attention is first directed to FIG. 1 which shows a transfer mechanism or "module", generally designated by reference number 1, of the conveyor system described in the above-discussed U.S. Pat. No. 4,313,536. The "module" 1 is driven by a motor 5 having a sprocket wheel 8 which is connected to another sprocket wheel 12 through chain 10. One side of the sprocket wheel 12 bears against a fixed thrust washer 11. Another thrust washer 16 is biased against the other side of sprocket wheel 12 by spring 13. The thrust washers 11 and 16 are both fixed to a drive shaft 14 against relative rotation. One of the thrust washers is, however, arranged to be axially movable. The drive shaft 14 is directly coupled to a drive assembly, generally referred to by reference numeral 15. The drive assembly 15 has a plurality of pinion gears 18 which receive the rotation of the sprocket wheel 12 through the thrust washers 11 and 16 and drive shaft 14. The pinion gears 18 then rotate flexible shafts 20 which connect with the planar array of rollers 22 mounted on bearing members 24, 26.

Figure 2:
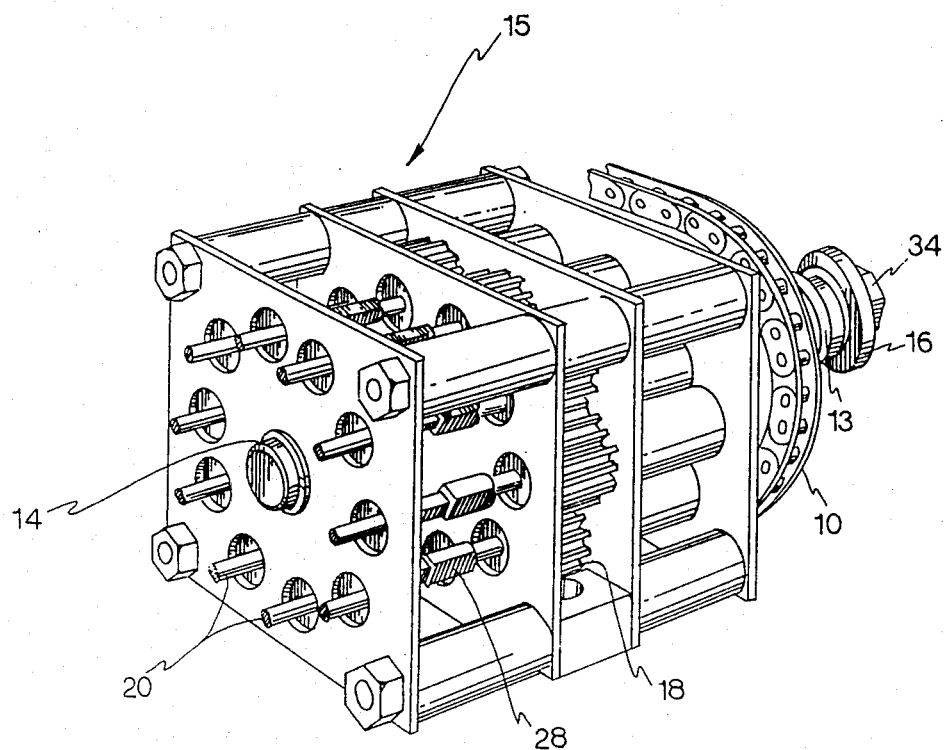
FIG. 2 is a perspective view of a drive unit of the transfer mechanism or "module" according to the prior art.

FIG. 2, shows in more detail the various elements operating in drive assembly 15. Each of the pinion gears 18 is fixed to a pinion shaft 28. In turn, a flexible shaft 20 is fitted into each pinion shaft 28.

Figure 3:
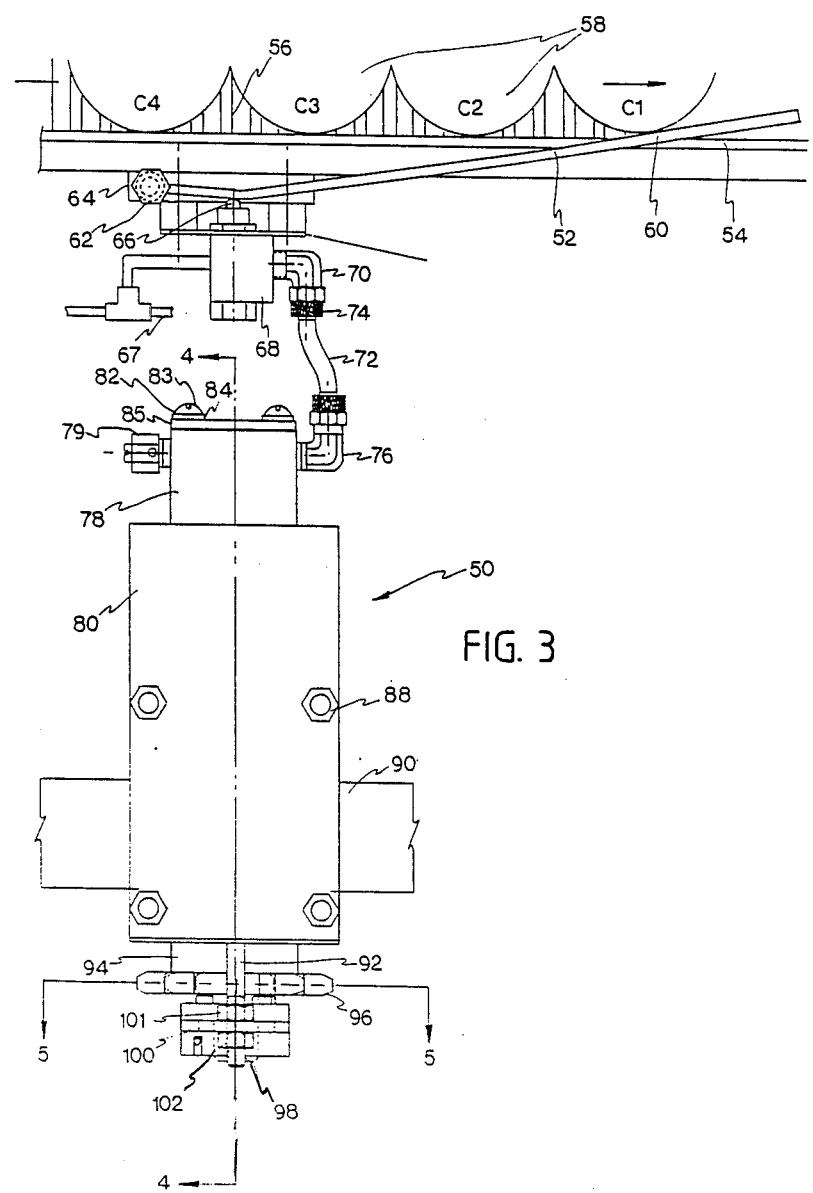
FIG. 3 is a top plan view of one embodiment of an improved drive unit in accordance with the present invention showing an associated pneumatic system with a shifter and an actuating arm ready for use.

FIG. 3 shows the improved drive assembly of one embodiment of the instant invention, generally designated by reference numeral 50. The improved drive assembly 50 can be used in the above-described "module" 1 in place of the drive assembly of the prior art, although it is not limited thereto. The improved drive assembly 50 has an actuating arm 52 which sufficiently extends beyond the boundary line 54 of a path 56 travelled by articles 58 being transported on a system similar to the above-described planar array of rollers 22 which could be a conveyor, an accumulation table, or the like. The actuating arm 52 has a pivoted end portion 62 and a free end portion 60 which extends between the path 56 and an actuating button 66 of a pneumatic valve 68 which is connected to an air supply device. Free end 60 of the actuating arm 52 can be deflected by at least one of the articles 58, preferably when the articles 58 accumulate in a pattern. The pivoted end 62 of the actuating arm 52 is retained by a pivot block 64. The actuating button 66 is resiliently disposed, preferably by a spring-like member (not shown), in the pneumatic valve 68 to a normally extended position so that the actuating arm 52 against which the actuating button 66 bears is returned to its original position after accumulation of the articles 58 is relieved. As partially shown in FIG. 3, an air inlet 67 from the air supply can be successively joined to a plurality of pneumatic valves 68. The pneumatic valve 68, which is conventionally manufactured, e.g., by Clippard Co., has an outlet tube 70 which connects to an intermediate tube 72 by a conventional fastening bolt 74. The intermediate tube 72 is in turn connected to an external tube 76 of an actuator cylinder 78 preferably fastened in a similar manner. The actuator cylinder 78 has an air release valve 79 which can be adjusted to maintain the desired air pressure inside the actuator cylinder 78 and relieve the pressure when the pneumatic valve 68 is closed. The actuator cylinder 78 is mounted on an actuator support member 80 preferably by at least one bolt 82 having a head 83 with a washer 84 abutting a back plate 85 in order to prevent excessive load on the actuator support member 80 when the bolt is fastened. The actuator support member 80, which can be a housing if desired, mounts above a drive assembly 15 or the like, modified according to the present invention, by means of a plurality of nut and bolt combinations 88 in a manner which will later be discussed. The lower portion of the drive assembly 15, or the like, is preferably mounted on a fixed plate assembly 90 located proximately adjacent the conveyor path 56.

As further shown in FIG. 3, a shifter rod 92 which is also mounted below the actuator support member 80 extends above a keyed sprocket 94 having a sprocket wheel 96, preferably integral thereto. A threaded end 98 of the shifter rod 92 accommodates a shifter member 100 between at least a pair of nuts 101, 102.

Figure 4:
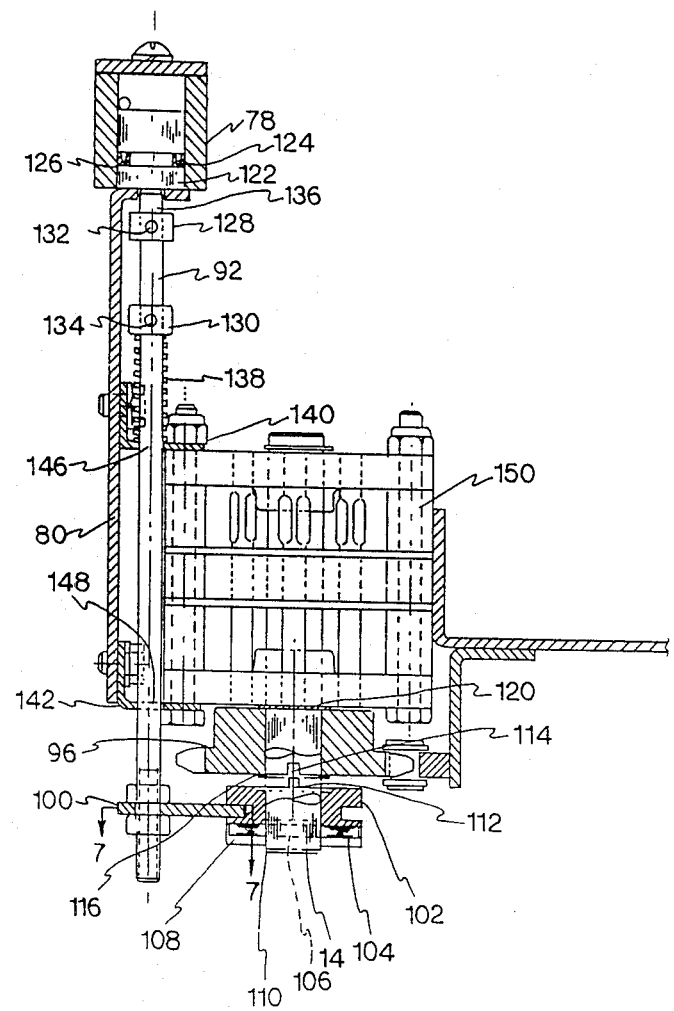
FIG. 4 is a cross-sectional view of the improved drive unit taken in the direction of arrows 4—4 shown in FIG. 3 illustrating how a shifter rod disengages a sprocket when displaced by a pneumatic cylinder.

As shown in FIG. 4, the shifter member 100 is seated in an annular groove 154 (see FIG. 6b) in a drive collar 102 which is attached to the drive shaft 14 by a drive pin 104. The pin 104 extends through an aperture 106 passing through the drive shaft 14 and is accommodated within a space 108 at the outer end portion of the drive collar 102. The drive collar 102 has an aperture 110 passing therethrough which accommodates the drive shaft 14.

As further shown in FIG. 4, the inner end of the drive collar 102 has a lateral protruding portion 112 which is inserted into a slit portion 114 of the sprocket wheel 96. A ring washer 116 is placed between the drive collar 102 and the sprocket wheel 96 for proper seating thereto. At the inner end portion of the sprocket wheel 96 is a retainer ring 120, such as a "True Arc" or "Ramsey"-type retainer ring, which can be snugly fitted into a groove (not shown) along the circumference of the drive shaft 14.

When the improved drive assembly 50 is in operation, air is injected into the actuator cylinder 78 thereby displacing a plunger 122 towards the shifter rod 92. The plunger 122 has a seal washer 124 being accommodated by a groove 126 thereof. The shifter rod 92 has stoppers 128, 130 which are coupled thereto, in an adjustable manner with the use of externally adjustable threaded members 132, 134, respectively. Stopper 128 abuts the inner portion of the actuator support member 80 when the end portion 136 is inside the actuator cylinder 78. Stopper 130 abuts a spring 138 which normally deflects the end portion 136 inside the actuator cylinder 78 when air is not supplied thereto. The end portion 136 is thereby used to deflect the plunger 122 when air inside the actuator cylinder 78 escapes through the air release valve 79 which is regulated to provide a desired internal pressure in the actuator cylinder 78. The spring 138 further abuts against a support bracket 140. The support bracket 140, as well as another support bracket 142, have apertures 146, 148, respectively, passing therethrough for accommodating and supporting the length of the shifter rod 92. Further, the support brackets 140, 142 are preferably L-shaped in order to be able to mount the actuator support member 80 onto a drive assembly 150 which may be similar to the drive assembly 15, previously discussed.

When the plunger 122 deflects the shifter rod 92, the shifter member 100 causes the drive collar 102 to disengage from the sprocket wheel 96. Upon disengagement of the drive collar 102, the sprocket wheel 96 is then free to rotate relative to the drive shaft 14, that is, to "free wheel".

When the sprocket wheel 96 rotates freely relative to the drive shaft 14, the rollers 22 in turn stop rotating and transport of the accumulated articles 58 is halted.

When the accumulation of articles 58 is relieved, the actuating arm 52 is deflected back to its original position by the spring-loaded actuating button 66 which in turn permits the plunger 122 of the actuator cylinder 78 to be withdrawn. Consequently, the end portion 136 of the shifter rod 92 is shifted and deflected towards the plunger 122. The shifting or deflection of the shiftig rod 92 then causes the drive collar 102 to engage the sprocket wheel 96, in a manner more fully discussed below, thereby rotating the drive shaft 14.

Figure 5:
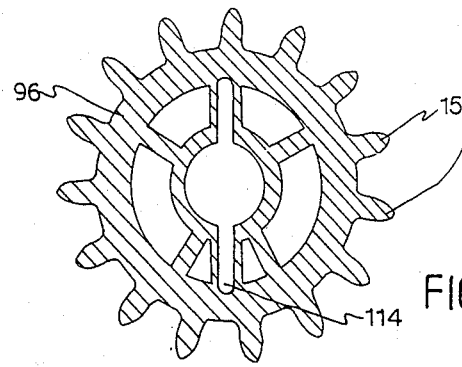
FIG. 5 is a cross-sectional view of the keyed sprocket taken in the direction of arrows 5—5 in FIG. 3.
Figures 6A, 6B:
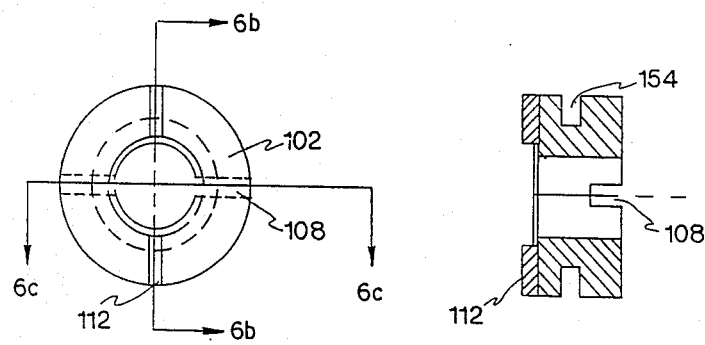
Figure 6C:
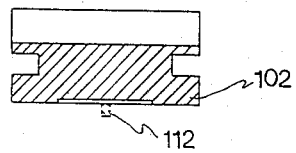

FIG. 5 illustrates a plurality of teeth 152 surrounding the sprocket wheel 96 having a centrally located slit portion 114 for accommodating the lateral protruding portion 112 of the drive collar 102 during engagement. FIG. 6a shows the drive collar 102 having the lateral protruding portion 112. FIGS. 6b and 6c are further illustrations of the drive collar 102 having the preferably integral protruding portion 112 suitable for being keyed or inserted in the slit portion 114 of the sprocket wheel 96 during engagement the drive collar 102. Further shown in FIG. 6b is the space 108 for accommodating the pin 104 which connects the drive collar 102 to the drive shaft 14.

Figure 7:
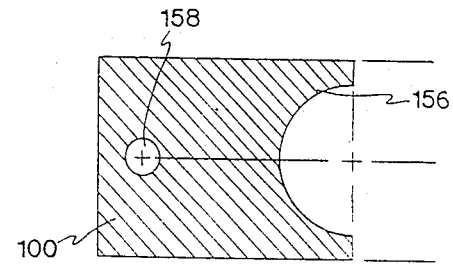
FIG. 7 is a cross-sectional view of a shifter for connecting the shifter rod and the keyed sprocket taken in the direction of arrows 7—7 shown in FIG. 4.

Shown in FIG. 7 is the shifter member 100 which has a preferably concavely semi-circular end portion 156 which allows the shifter member 100 to abut against the drive collar 102 through the groove portion 154. The shifter member 100 also has an aperture 158 passing therethrough for accommodating the shifter rod 92.

Figure 8:
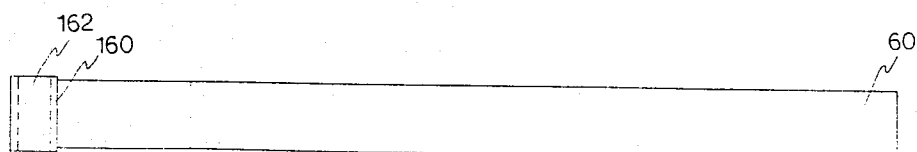
FIG. 8 is a side elevational view of the actuating arm of the improved drive unit of the present invention.

FIG. 8 illustrates the actuating arm 52 which has the pivoted end 62 preferably configured like a cylinder 160 having an aperture 162 passing therethrough. The cylinder 160 is preferably freely bolted onto the pivot block 64.

The use of the improved drive assembly 50 described with a drive mechanism as shown in FIGS. 1 and 2 is not meant to limit the scope of the instant invention.

Also, instead of using an actuating arm 52, as described above, other types of actuating means, not limited to a mechanical version, can be used.

Figure 9:
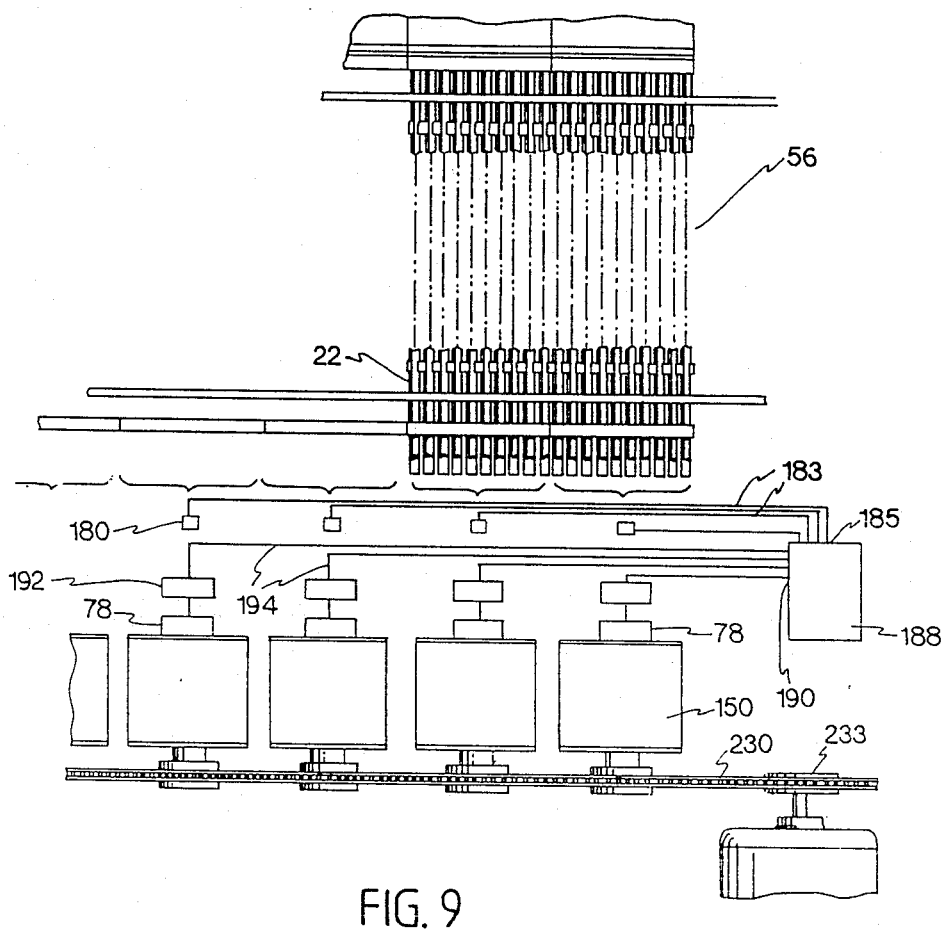
FIG. 9 is a top plan view showing diagrammatically a conveyor system comprising a plurality of drive units controlled by an associated programmable controller connected to a series of solenoid valves and sensors along an accumulation area of the conveyor path.

In FIG. 9, there is shown a partial schematic or diagrammatic view of a plurality of the transport mechanisms having a series of drive assemblies 50 of the present invention is shown with a plurality of sensors 180, such as optical or electrical devices, all well-known in the art, preferably located adjacent the accumulation area of the path 56 travelled by the articles 58 (i.e., along the conveyor or accumulation table similar to the above-described planar array of rollers 22). Connecting means such as wires 183 operatively connect each of the sensors 180 to an input portion 185 of a programmable controller (PC) 188. An output portion 190 of the PC 188 is operatively connected to a plurality of solenoid valves 192 by connecting means such as wires 194. In turn, one of solenoid valves 192 is operably connected to the actuator cylinder 78 of each drive assembly 150. The series of sensors 180, in conjunction with the PC 188 and the solenoid valves 192, permit the sequential stopping and re-starting of the drive assemblies 150. The drive assemblies 150 are re-started when the sensors 180 indicate that normal article flow is to be resumed. Preferably, the sensors 180 are connected to the input portion 185 of the PC 188, although certain sensors 180 may have built-in time delay characteristics which may warrant the removal of the PC 188 and have the sensors 180 directly connected to the solenoid valves 192. However, as known in the art, the PC 188 will significantly enhance the sequencing operation of the drive assemblies 150. Programmable controllers are well-known in the art and are commercially available. Those skilled in the art are aware of the mode of pre-setting the controllers to provide an output signal to means such as solenoid valves 192 responsive to signals received from means such as sensors 180. Although FIG. 9 shows a sensor 180 for each solenoid valve 192, this arrangement is not meant to limit the scope of the instant invention. A single sensor or a prescribed number thereof can be inputted into the PC 188 having the output portion 190 thereof connected to the series of solenoid valves 192.

Figure 10:
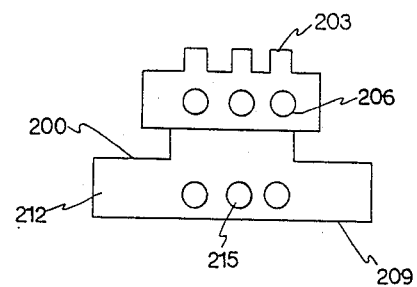
FIG. 10 is a schematic diagram of a 3-way 2-position solenoid valve for use with the drive units.

As a practical matter, solenoid valves can be ganged as shown in FIG. 10, which illustrates a 3-way 2-position type solenoid valve 200, manufactured, for example, by C.A. Norgren Co. The solenoid valve 200 has at least three air passages 203, each passage to be connected to at least one actuator cylinder 78. Further, the solenoid valve 200 has at least three terminals 206 for connecting with the PC 188. At a manifold portion 209 are air inlet 212 and outlet passages 215. The air inlet 212 is connected to the air supply.

Figure 11:
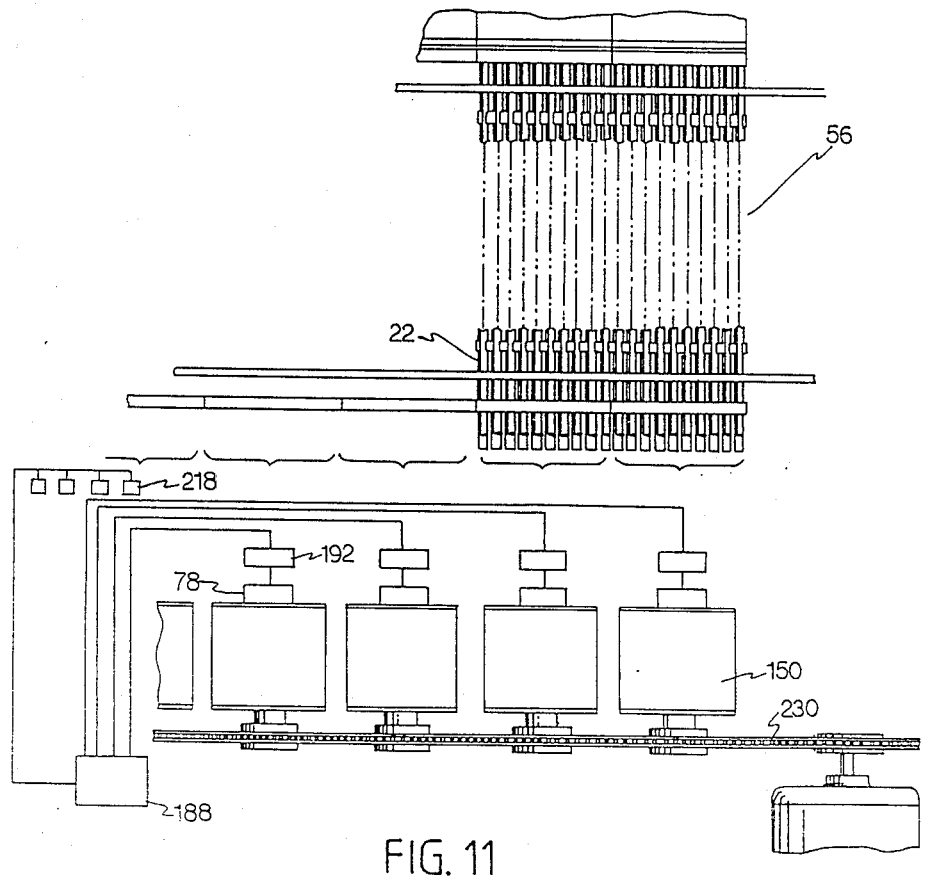
FIG. 11 is a top plan view showing diagrammatically a conveyor system comprising a plurality of drive units controlled by an associated programmable controller connected to a series of solenoid valves and counting or timing devices along an in-feed portion of the conveyor path.

In FIG. 11, a similar type of arrangement as discussed in FIG. 9, is shown, except for the substitution of the plurality of sensors 192 with a plurality of counting or timing devices 218 connected to the PC 188. Further, the counting or timing devices 218 are located at the in-feed portion of the accumulation area of the conveyor path 56. The series of counting or timing devices 218. like the sensors 180, in conjuncton with the PC 188 and the solenoid valves 192, permit the sequential stopping and restarting of the drive assemblies 150. The sequential operation of the drive assemblies can thus be performed relative to the number or the speed of the articles 58 along the conveyor path 56.

In FIGS. 9 and 11, the drive assemblies 150 are preferably arranged side-by-side as shown. The improved drive assemblies 150 with the above-discussed mechanical actuating arms 52 are similarly arranged.

Figure 12:
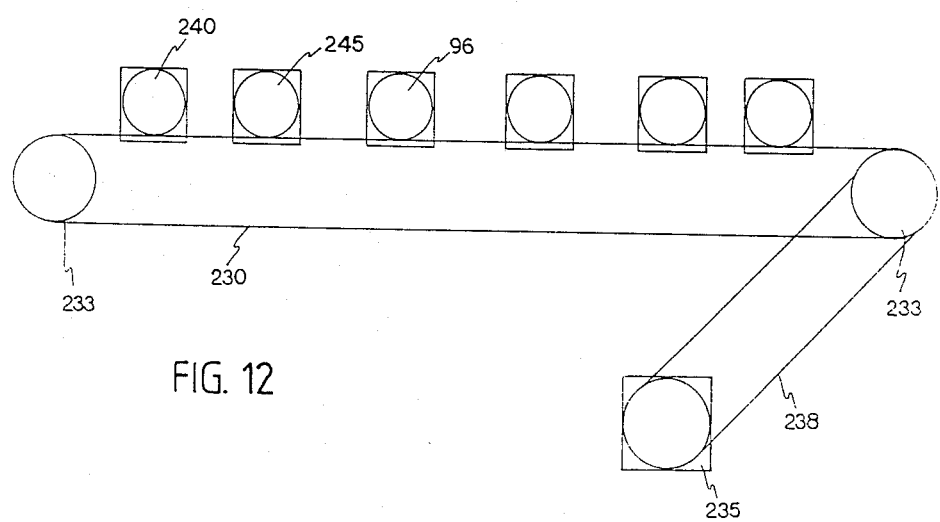
FIG. 12 is a schematic view of the manner in which a series of sprocket wheels of the drive units can be driven.

FIG. 12 shows the arrangement wherein the series of sprocket wheels 96 are operated by a single chain 230 being driven by end sprockets 233. At least one of the end sprockets 233 is driven by a drive means such as a motor 235 with chain 238. In order to conserve space, each end sprocket 233 can be positioned below and between one of the end sprocket wheels 240 and the immediately adjacent sprocket wheel 245 in order to form a more compact arrangement. When this is done, sprocket wheel 245 will have at least two sets of teeth, one set of teeth for connecting with the end sprocket 240 by a chain (not shown) different from chain 230 and another set of teeth for connecting with chain 230. It should be understood that while sprocket wheels and chains have been described as providing the primary driving force, any equivalent driving means could be used.

While the invention has been particularly shown and described by reference to preferred embodiments thereof, it will be understood by those skilled in the art that changes in form and details may be made therein without departing from the spirit and scope of the invention.

I claim:

1. A transfer system for transporting articles, comprising: a plurality of transport modules, each transport module having a plurality of parallel rollers disposed in a planar array; means for driving said rollers; means for powering said drive means; means for connecting said drive means with said rollers to individually drive said rollers; means operatively connected to said drive means for controlling said drive means; and means operably coupled to a pneumatic valve means for sequentially and independently activating and deactivating said controlling means responsive to a predetermined parameter in the flow of said articles along said system, and wherein said means for controlling said drive means comprises actuator valve means operably joined to said pneumatic valve means for directly activating a shifter rod for operably engaging and disengaging said powering means from said drive means.

2. The transfer system as in claim 1, wherein said means for controlling said actuator valve means is pneumatically operated.

3. The transfer system as in claim 1, wherein said means operatively coupled to a pneumatic valve means is a mechanical means for sensing the presence of accumulated articles by a physical contact therewith and activating said controlling means responsive thereto.

4. The transport system as in claim 1, wherein said means operatively coupled to a pneumatic valve means is a sensor means for monitoring a predetermined condition of said articles during flow thereof along said system and activating said controlling means responsive thereto.

5. The transport system as in claim 1, wherein said means operatively coupled to a pneumatic valve means is a counting means for monitoring a predetermined condition of said articles during flow thereof along said system and activating said controlling means responsive thereto.

6. The transport systems as in claim 1, wherein said means operatively coupled to a pneumatic valve means is a timing means for monitoring a predetermined condition of said articles during flow thereof along said system and activating said controlling means responsive thereto.

7. A method of operating a conveyor having a plurality of modules, each module comprising a plurality of rollers disposed in a planar array and means for driving said rollers; and means for powering said drive means; said method comprising the steps of:
sensing a predetermined parameter during the flow of a plurality of articles along said conveyor;
independently and sequentially activating and deactivating a pneumatic valve means upon sensing of said predetermined parameter;
sequentially engaging and disengaging said powering means from said rollers by actuator valve means of actuator cylinder means responsive to said step of activating and deactivating said pneumatic valve means; said pneumatic valve means operably joined to said actuator valve means to thereby control said actuator valve means.

8. The method of operating a conveyor as in claim 7, wherein each said drive means comprises a drive shaft operatively connected to said rollers and a sprocket assembly adapted to engage and disengage said drive shaft, and said sprocket assembly is driven by said powering means, said step of sequentially engaging and disengaging comprising sequentially engaging said sprocket assemblies with their associated drive shafts and disengaging said sprocket assemblies from their associated drive shafts.

9. The method of operating a conveyor as in 8, further comprising the step of sequentially displacing a series of shifter rods responsive to said pneumatic valve means.

10. The method of operating a conveyor as in claim 9, which further comprises the step of sequentially actuated and deactuating a series of actuator valve means upon sensing of said predetermined parameter, said pneumatic valve means, in turn, activating and deactivating said actuator valve means.

11. The method of operating a conveyor as in claim 9, wherein said step of sensing comprises sensing article flow along said conveyor.

12. The method of operating a conveyor as in claim 9, wherein said step of sensing comprises counting articles along said conveyor., 13. The method of operating a conveyor as in claim 9, wherein said step of sensing comprises timing the flow of articles along said conveyor.

14. A transfer mechanism for transporting articles which comprises a plurality of parallel rotatable rollers disposed in a planar array, forming a conveyor, and drive means, said drive means comprising:
(a) input drive means having drive transmtiting surfaces;
(b) a plurality of drive takeoff members disposed in a circular array around the periphery of, and driven by, said input drive means;
(c) a flexible coupling connecting each of said rollers with one of said takeoff members, whereby rotation of said takeoff members causes rotation of said rollers; and
(d) means for driving said input drive means, said driving means comprising: (1) a sprocket assembly, (ii) movable drive collar means having an interlocking means capable of cooperating with a complementary locking means of said sprocket assembly for locking and unlocking said sprocket assembly to and from a drive shaft, (iii) shifter means operably connected to said movable drive collar means for controlling said drive collar means; (iv) actuator cylinder means having a movable plunger therein for controlling said shifter means; (v) pneumatic valve means operably connected to said actuator cylinder means for operating said actuator cylinder means; and (vi) means operably coupled to said pneumatic valve means for determining article flow parameters.

15. A transfer mechanism as in claim 14, wherein said input drive means is a drive gear and said plurality of drive takeoff members is a plurality of pinion gears.

16. A transfer mechanism as in claim 15, wherein said means for driving said input drive means, further comprising a prime mover which is a motor and is connected to said sprocket assembly by a chain.

17. A transfer mechanism as in claim 16, wherein said means for driving said input drive means, further comprising a prime mover which is a motor and is connected to said sprocket assembly by a cog belt.

18. A transfer mechanism as in claim 14, wherein said gears are fabricated of nylon.

19. A transfer mechanism as in claim 26 wherein said pinion gears are fixedly mounted on pinion shafts and said flexible shafts are each fixed to a respective pinion shaft.

20. A conveyor system comprising a series of transfer mechanisms for transporting articles, each transfer mechanism comprising a plurality of parallel rotatable rollers disposed in a planar array, forming a conveyor, and drive means, said drive means comprising:
(a) input drive means having drive transmitting surfaces;

(b) a plurality of drive takeoff members disposed in a circular array around the periphery of, and driven by, said input drive means;

(c) a flexible coupling connecting each of said rollers with one of said takeoff members, whereby rotation of said takeoff members causes rotation of said rollers; and (d) means for driving said input drive means, said driving means comprising: (1) a sprocket assembly, (ii) moveable drive collar means having an interlocking means capable of cooperating with a complementary locking means of said sprocket assembly for locking and unlocking said sprocket assembly to and from a drive shaft, (iii) shifter means operably connected to said movable drive collar means for controlling said drive collar means; (iv) actuator cylinder means having a movable plunger therein for controlling said shifter means; (v) pneumatic valve means operably connected to said actuator cylinder means for operating said actuator cylinder means; and (vi) means operably coupled to said pneumatic valve means for determining article flow parameters;

each transfer mechanism being operated independently responsive to said article flow parameters.

* * * * *